United States Patent [19]

Okamoto

[11] Patent Number: 5,309,385
[45] Date of Patent: May 3, 1994

[54] VECTOR DIVISION PROCESSING METHOD AND SYSTEM

[75] Inventor: Fuyuki Okamoto, Tokyo, Japan
[73] Assignee: NEC Corporation, Tokyo, Japan
[21] Appl. No.: 917,389
[22] Filed: Jul. 23, 1992

[30] Foreign Application Priority Data

Jul. 30, 1991 [JP] Japan .................................. 3-189074

[51] Int. Cl.⁵ .......................... G06F 7/52; G06F 7/38
[52] U.S. Cl. .................................... 364/761; 364/736
[58] Field of Search ............... 364/761, 762, 764, 765, 364/736

[56] References Cited

U.S. PATENT DOCUMENTS

| | | | |
|---|---|---|---|
| 4,725,974 | 2/1988 | Kanazawa ............................ | 364/765 |
| 4,797,849 | 1/1989 | Nakano ................................. | 364/765 |
| 5,140,545 | 8/1992 | Vassiliadis et al. ................. | 364/765 |

FOREIGN PATENT DOCUMENTS 60-86671 5/1985 Japan .................................. 364/765

*Primary Examiner*—Jerry Smith
*Assistant Examiner*—Chuong D. Ngo
*Attorney, Agent, or Firm*—Sughrue, Mion, Zinn, Macpeak & Seas

[57] ABSTRACT

In vector dividing the process employing convergence division method, the process steps are performed for performing pipeline processing of multiplying operation of the dividend and a first convergence factor in a speed of one clock cycle per one element to generate a first intermediate result vector data as a data before convergence, for performing pipeline processing of multiplying operation of the divisor and the first convergence factor in a speed of one clock cycle per one element to generate a second intermediate result vector data as a data before convergence, for storing the first and second intermediate result vector data to first and second intermediate result storing vector registers, respectively, for reading out of the first and second intermediate result vector data from the first and second intermediate result storing vector registers, respectively, per every clock cycles, for performing pipeline processing for multiplying operation of the read out intermediate result vector data and a second convergence factor as the next convergence factor in a speed of one clock cycle per one element to generate third and fourth intermediate result vector data, and for repeating the same process from the third step to fifth step until reaching to a nth convergence factor as a predetermined final convergence factor, and outputting a quotient vector as the final convergence result in a speed of one clock cycle per one element.

6 Claims, 3 Drawing Sheets

VECTOR DIVISION PROCESSING METHOD AND SYSTEM

BACKGROUND OF THE INVENTION

The present invention relates to a method and a system for vector dividing. More particularly, the invention relates to a method and a system for vector dividing employing convergence division.

As is well known, in convergence division, sequential repeated multiplying operations are performed both for a divisor and a dividend, these being multiplied with a plurality of convergence factors employing a recurrence formula to converge the result of the repeated multiplying operation. Specifically, the divisor converges to 1 and the result of the repeated multiplying operation of the dividend converges to the quotient. The result of the division is thereby obtained.

The convergence division will be discussed in further detail by taking an example of $N \div D$ ($0 < N < D$). In the dividing operation for $N \div D$, at first, a sequence $P_0, P_1, \ldots, P_{n-1}$, with which a product obtained by multiplying the sequence with the divisor D converges to 1, is found.

$$D \times P_0 \times P_1 \times \ldots \times P_{n-1} \to 1$$

At this time, $N \times P_0 \times P_1 \times \ldots \times P_{n-1}$ converges to a quotient Q as expressed in the following formula:

$$\begin{aligned} Q &= N/D \\ &= (N \times P_0 \times P_1 \times \ldots \times P_{n-1})/(D \times P_0 \times P_1 \times \ldots \times P_{n-1}) \\ &\to Q/1 \end{aligned}$$

Assuming that the divisor D has a value in the range of $\frac{1}{2} \leq D < 1$, the divisor D can be expressed by the following equation:

$$D = 1 - \eta \quad (0 < \eta \leq \tfrac{1}{2})$$

Then, assuming $P_0 = 1 + \eta$, the next divisor $D_1$ can be derived through the following equation:

$$D \times P_0 = D_1 = 1 - \eta^2 \quad (0 < \eta^2 \leq 2^{-2})$$

Next, assuming $P_1 = 1 + \eta^2$, the subsequent divisor $D_2$ can be derived through the following equation:

$$D \times P_0 \times P_1 = D_2 = 1 - \eta^4 \quad (0 < \eta^4 \leq 2^{-4})$$

From the above, the divisor $D_i$ can be generally expressed by the following equation and converges to 1:

$$D \times P_0 \times P_1 \times \ldots \times P_{i-1} = D_i = 1 - \eta^{2(i+1)}$$

Since $P_0 = 1 + \eta$, $D = 1 - \eta$, $P_0 + D = 2$, therefore, the relationship expressed by the following equation can be obtained:

$$P_0 = 2 - D, \ P_1 = 2 - D_1, \ \ldots \ P_i = 2 - D_i, \ \ldots$$

Accordingly, respective values of $P_i$ can be obtained by deriving the two's complement of $D_i$. Then, as set forth above, $N \times P_0 \times P_1 \times \ldots \times P_{n-1}$ can converge to the quotient Q. Therefore, the quotient Q can be obtained through the following operation.

$$N \times P_0 = N_1 \ (P_0 = 2 - D) \quad (1)$$
$$D \times P_0 = D_1 \ (P_0 = 2 - D) \quad (2)$$

-continued
$$N_1 \times P_1 = N_2 \ (P_1 = 2 - D_1) \quad (3)$$
$$D_1 \times P_1 = D_2 \ (P_1 = 2 - D_1) \quad (4)$$

$$N_{n-1} \times P_{n-1} = N \approx Q \ (P_{n-1} = 2 - D_{n-1}) \ \ldots \ (2n - 1)$$

As set forth above, in the convergence division described, a plurality of multiplying operations as expressed by the equations (1) through ($2n-1$) has to be performed for obtaining one quotient. Particularly, in case of vector data constituted of a plurality of elements, the multiplying operation of the equations (1) through ($2n-1$) is first sequentially performed for the first element to obtain the quotient for the first element. Next, a similar multiplying operation is sequentially performed with the equations (1) through ($2n-1$) for the second element to obtain the quotient of the second element. For subsequent elements, similar operations are repeated for obtaining respective quotients.

In the normal vector processing system, operands are read out from a vector register at every clock cycle, and arithmetic operations, such as addition and multiplication and so forth are processed through pipeline processing. Therefore, the results of an arithmetic operation are output at every clock cycle. However, in case of the above-mentioned convergence division, multiplying operations have to be repeated many times in order to obtain the quotient for one element. It has therefore not been possible to output the result of a dividing operation at every clock cycle with the conventional vector dividing system. Also, in the conventional vector dividing system, it is not possible to read out the dividend and divisor as the operand from the vector register at every clock cycle.

As set forth above, the conventional method and system do not permit outputting the results of operation at every clock cycle and also do not permit reading out the operand at every clock cycle, since a plurality of multiplying operation iterations are required for obtaining one quotient. Therefore, this method cannot realize a high speed process employing pipeline processing.

Therefore, it is an object of the present invention to provide a vector dividing method and system which enables outputting quotients at every clock cycle while employing the pipeline processing and which can shorten the process period required for completion of arithmetic operations for all of a set of vector elements.

SUMMARY OF THE INVENTION

According to the present invention, there is provided a vector dividing process employing a convergence division method for performing repeated multiplying operations with a plurality of convergence factors as vector data expressed by a recurrence formula, for both of vector data as divisor and vector data as dividend to converge the result of multiplication for the divisor to "1" and to converge the result of multiplication for the dividend to a quotient, which comprises the steps of:

first step for performing pipeline processing of multiplying the dividend and a first convergence factor in a speed of one clock cycle per one element to generate a first intermediate result vector data as a data before convergence;

second step for performing pipeline processing of multiplying the divisor and the first convergence factor in a speed of one clock cycle per one element to generate a second intermediate result vector data as a data before convergence;

third step for storing the first and second intermediate result vector data to first and second intermediate result storing vector register;

fourth step for reading out the first and second intermediate result vector data from the first and second intermediate result storing vector registers, respectively, at every clock cycle;

fifth step for performing pipeline processing of multiplying the read out intermediate result vector data and a second convergence factor as the next convergence factor at a speed of one clock cycle per one element to generate third and fourth intermediate result vector data; and sixth step for repeating the same process from the third step to the fifth step until reaching an nth convergence factor as a predetermined final convergence factor, and outputting a quotient vector as the final convergence result at a speed of one clock cycle per one element.

According to the present invention, there is also provided a vector division processing system employing a convergence division method for performing repeated multiplying operations with a plurality of convergence factors as vector data expressed by a recurrence formula, for both of vector data as divisor and vector data as dividend to converge the result of multiplication for the divisor to "1" and to converge the result of multiplication for the dividend to a quotient, which comprises:

a first vector register having a storage area for storing the dividend and a storage area for storing an intermediate result of the repeated multiplying operation with respect to the dividend;

a second vector register having a storage area for storing the divisor and a storage area for storing an intermediate result of the repeated multiplying operation with respect to the divisor;

multiplying means for performing the repeated multiplying operation;

convergence factor generating means for generating the convergence factors, taking the output of the second vector register as input;

first selection means for selectively inputting the outputs of the first and second vector register as one input for the multiplying means;

second selection means for selectively inputting the outputs of the second vector register and the convergence factor generating means as the other input for the multiplying means; and means for performing control in such a manner that data are read out from the first and second register at every clock cycle and that the multiplying means performs the multiplying operation for the read out data and the convergence factor in pipeline processing at a speed of one clock cycle per one element.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

In advance of discussion for the preferred embodiment of the present invention, brief discussion of the vector division method and system in the prior art will be given, for facilitating better understanding of the invention.

Figure 3:
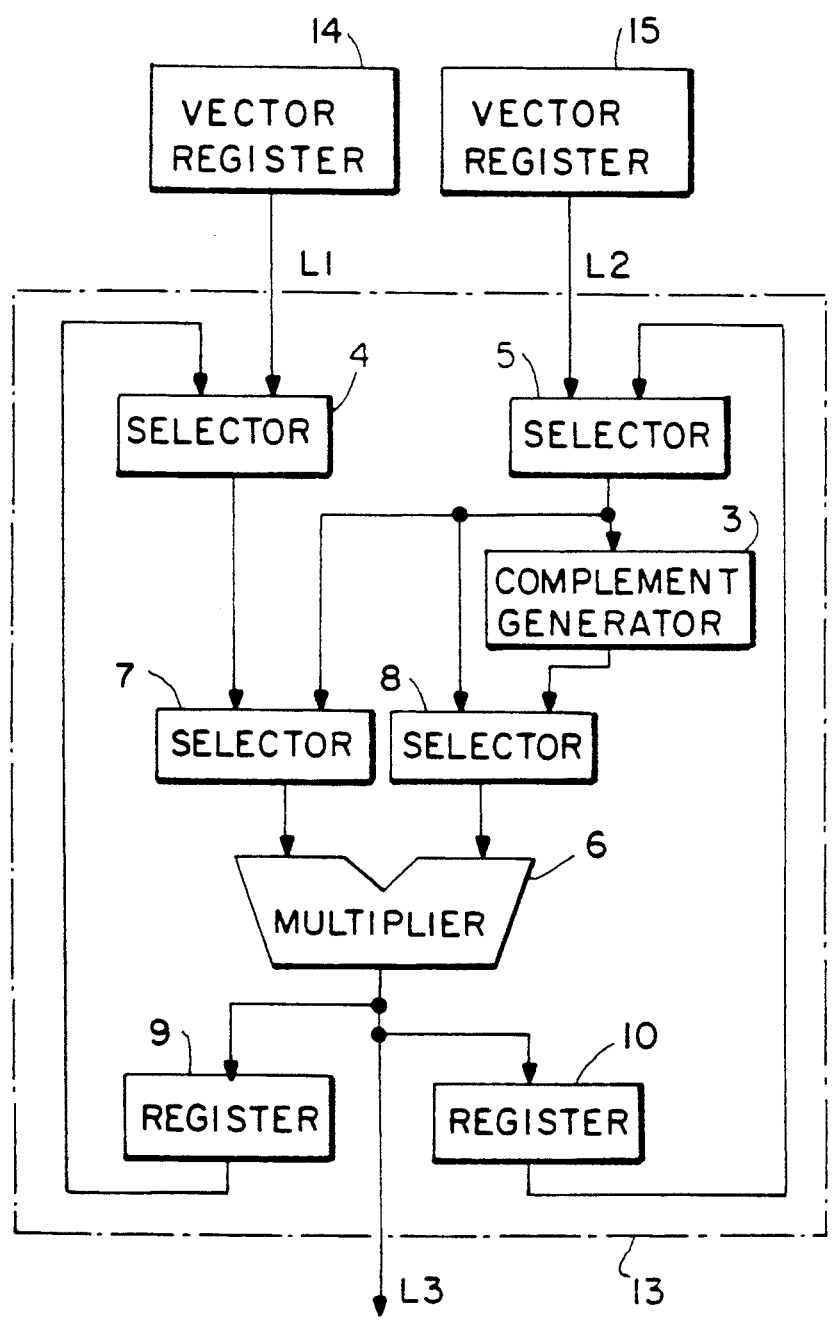
FIG. 3 is a block diagram showing the conventional divider system for discussion of the conventional vector dividing method.

At first, reference is made to FIG. 3, which is block diagram of a conventional vector divider system. The conventional vector divider system comprises two vector registers 14 and 15 and a divider 13 which performs a dividing process for vector data $L_1$ and $L_2$ from the vector registers.

The divider 13 includes four selectors 4, 5, 7 and 8, a complement generator 3, a multiplier 6 and two registers 9 and 10. The selector 4 selectively outputs one of the vector data $L_1$ and an output data of the register 9. The selector 5 also selectively outputs one of the vector data $L_2$ and an output data of the register 10. The complement generator 3 performs generation of the two's complement of the output of the selector 5.

The selector 7 selectively outputs one of the outputs of the selectors 4 and 5. The selector 8 selectively outputs one of the outputs of the selector 5 and the complement generator 3. The multiplier 6 performs a multiplying operation of the outputs of the selectors 7 and 8 to input the product as a result to multiplying operation to the registers 9 and 10. Also, the multiplier 6 outputs the resultant product as a resultant data $L_3$.

Operation of the above-mentioned conventional vector divider system will be discussed. In advance of discussion of the dividing operation involving vector data, a brief discussion will be given regarding a dividing operation for scaler data.

(A) Arithmetic Operation for $N_1$

A dividend N and a divisor D are respectively input as data $L_1$ and $L_2$. The divisor D is input to the complement generator 3 via a selector 5. Then, the complement $P_0(=2-D)$ of D is output from the complement generator 3. The selectors 4 and 7 selectively output the dividend N to the multiplier 6. The multiplier 6 calculates $N_1 = N \times P_0$ and stores the results in the register 9.

(B) Arithmetic Operation for $D_1$

The divisor D is input through a data line $L_2$ to the complement generator 3 via the selector 5. The complement generator 3 then calculates the complement $P_0$ $(=2-D)$ of D to output. The selector 7 selectively outputs the divisor D as the output of the selector 5 to the multiplier 6. The multiplier 6 calculates $D_1 = D \times P_0$ and stores the resultant product in the register 10.

(C) Arithmetic Operation for $N_2$

Next, $N_1$ is read out from the register 9. The read out $N_1$ is input to the multiplier 6 via the selectors 4 and 7.

On the other hand, $D_1$ is read out from the register 10. The read out $D_1$ is input to the complement generator 3 via the selector 5. Then, the complement generator 3 outputs the complement $P_1(2-D_1)$ of $D_1$. $P_1$ is input to the multiplier 6 via the selector 8. The multiplier 6 thus performs calculation for $N_2 = N_1 \times P_1$ to store the resultant product in the register 9.

(D) Arithmetic Operation for $D_2$

Next, $D_1$ is read out from the register 10. $D_1$ is input to the multiplier 6 via the selectors 5 and 7. On the other hand, $D_1$ is input to the complement generator 3 via the selector 5. Then, the complement generator 3 outputs the complement $P_1(=2-D_1)$ of $D_1$. $P_1$ is input to the multiplier 6 via the selector 8. The multiplier 6 calculates $D_2 = D_1 \times P_1$ to store the resultant product in the register 10.

Subsequently, calculations of $N_1$ and $D_1$ are performed in a manner similar to the foregoing processes of (C) and (D). During repetition of the processes (C) and (D), the dividend $N_1$ converges toward the quotient Q. The quotient Q is finally output through the data line $L_3$.

Next, discussion will be given describing processing of vector data by the conventional vector divider system shown in FIG. 3. When processing vector data, the conventional dividing method and the divider 13 are used in the following manner.

For the first element, calculations according to the equation (1) to (2n−1) are executed. Subsequently, in the same manner, calculations according to the equations are executed sequentially for all of the elements.

In FIG. 3, the vector data of the dividend is stored in the vector register 14, and the vector data of divisor is stored in the vector register 15.

At first, with respect to the first element, the dividend and the divisor are read out from respective vector registers 14 and 15. With respect to the read out dividend and the divisor, the above-mentioned repeated calculations for $N_1$ and $D_1$ are performed to output the quotients. Then, the dividend and the divisor of the second elements are read out from respective vector registers 14 and 15 to perform calculations for obtaining quotients. Subsequent calculations are performed sequentially for all vector elements in order.

Figure 4:
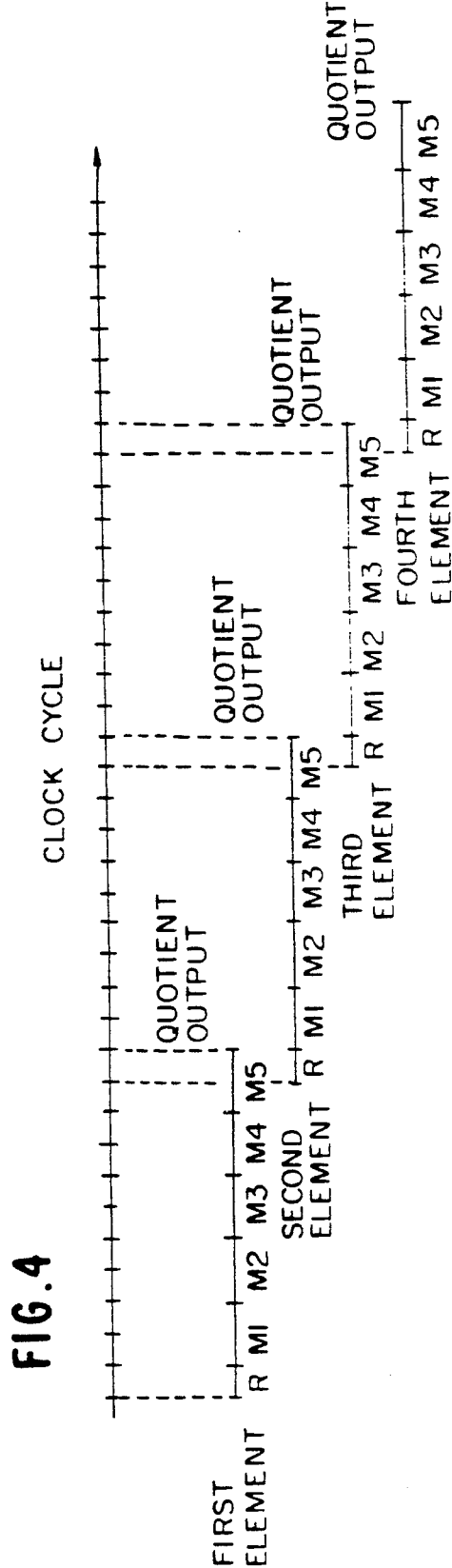
FIG. 4 is a timing chart showing an example of operation of the conventional divider system of FIG. 3.

FIG. 4 is a timing chart showing one example of operation of the conventional vector divider system. In the shown example, the number of vector elements is assumed to be four. It is further assumed that the calculations for $N_1$ and $D_1$ are performed every two clock cycle, in which five separate multiplying operations are required for obtaining quotients. In FIG. 4, R represents a reading out timing of the divisor and the dividend, and Mi represents a timing of the ith multiplication operation, in which the quotient is output at M5.

In the normal vector processing system, the operands are read out from the vector register at every clock cycle, and arithmetic operations of addition, multiplication and so forth are performed by pipeline processing, the resultant data being output at every clock cycles.

However, since the multiplying operations have to be repeatedly performed for obtaining a quotient in the dividing operation as set forth above, it is not possible to output the resultant data at every clock cycle. Also, it is not possible to read out the dividend and divisor as the operand at each clock cycle.

Generally, it is assumed that the vector length is v, the number of repetitions of the multiplying operation necessary for obtaining a quotient for one vector element is m, and the number of clocks needed for calculation of each of $N_i$ and $D_i$, namely, the step number of the pipeline forming the divider 13 of FIG. 3 is p. Then, in the conventional vector divider system, the quotient is output at clock cycles of mp and the number of clocks required for completing an operation for involving v vector elements is approximately vmp. On the other hand, the sum or formed product by an adder or a multiplier can be output at each clock cycle, and the necessary number of clocks for operation is approximately v.

As set forth, the conventional method and system for vector dividing require the multiplying operation to be performed a plurality of times to obtain one quotient. Therefore, it has been impossible to output the calculation results at each clock cycle and to read out the operand of the dividend and the divisor at each clock cycle. This hinders realizing higher speed processing.

The following describes the preferred embodiment of the present invention, which seeks to resolve the foregoing drawbacks.

Figure 1:
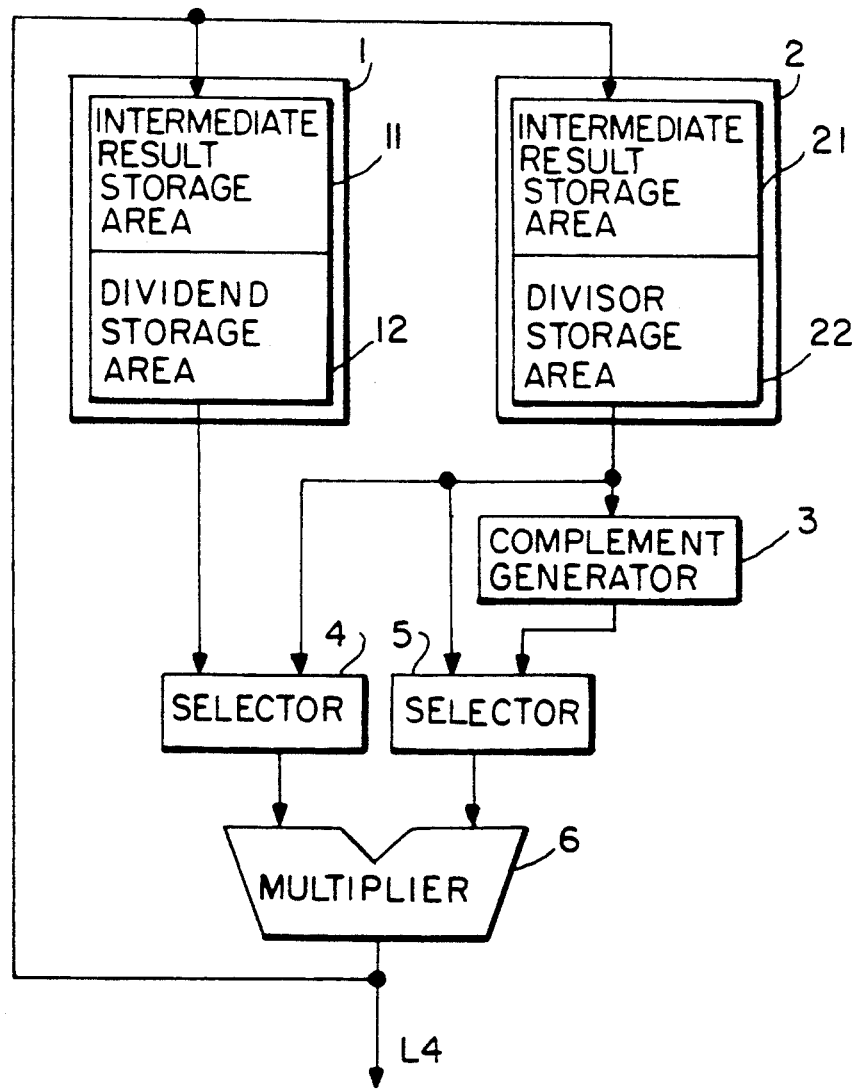
FIG. 1 is a block diagram of the preferred embodiment of a divider system for realizing the preferred embodiment of a vector dividing method according to the present invention.

FIG. 1 is a block diagram of the preferred embodiment a vector divider system according to the present invention. The shown embodiment of the vector divider system includes two vector registers 1 and 2, a complement generator 3 for generating convergence factors, two selectors 4 and 5 and a multiplier 6. The vector register 1 has a storage area 11 for storing intermediate results of arithmetic operation and a storage area 12 for storing the dividend. The vector register 2 has a storage area 21 for storing intermediate results of arithmetic operation and a storage area 22 for storing the divisor.

The complement generator 3 generates convergence factors and thus generates two's complements of the output of the vector register 2. The selector 4 selectively outputs the output data of the vector registers 1 and 2 as one of the inputs to the multiplier 6. The selector 5 selectively outputs the output data of the vector register 2 and the complement generator 3 as the other input to the multiplier 6. The multiplier 6 outputs the result of the multiplying operation as the intermediate result to the vector registers 1 and 2, and outputs the final result as data $L_4$.

The shown embodiment of the divider system performs vector dividing operations by performing multiplying operations according to the following equations (1)' through (2n−1)'. It should be appreciated that, by processing respective equations by pipeline processing, the results of the multiplying operations are output sequentially for one element per each clock cycle. In the following equation, suffix v is added for indicating that those data are vector data.

$$N_v \times P_{0v} = N_{1v} (P_{0v} = 2 - D_v) \quad (1)'$$
$$D_v \times P_{0v} = D_{1v} (P_{0v} = 2 - D_v) \quad (2)'$$
$$N_{1v} \times P_{1v} = N_{2v} (P_{1v} = 2 - D_{1v}) \quad (3)'$$
$$D_{1v} \times P_{1v} = D_{2v} (P_{1v} = 2 - D_{1v}) \quad (4)'$$

$$N_{(n-1)v} \times P_{(n-1)v} = N_{vn} \approx Q (P_{(n-1)v} = 2 - D_{(n-1)v}) \ldots (2n-1)'$$

With the vector divider system as shown in FIG. 1, the following vector dividing process is performed.

(A) Arithmetic Operation for Dividend $N_1$ of Vector Data $N_{1\nu}$

The dividend vector data $N_\nu$ stored in the dividend storage area 12 of the vector register 1 and the divisor vector data $D_\nu$ stored in the divisor storage area 22 of the vector register 2 are read out. The divisor vector data $D_\nu$ is input to the complement generator 3. Then, the complement generator 3 outputs a complement vector $P_{0\nu}(=2-D_\nu)$ of $D_\nu$. The selector 4 outputs the dividend vector data $N_\nu$ to the multiplier 6. The selector 5 outputs $P_{0\nu}$ of the complement generator 3 to the multiplier 6. The multiplier 6 calculates $N_{1\nu}=N_\nu \times P_{0\nu}$ and stores the result in the intermediate result storage area 11 of the vector register. By establishing the foregoing process as a pipeline process, the calculations for each element can be done sequentially, namely at every clock cycle.

(B) Arithmetic Operation for Divisor Vector Data $D_{1\nu}$

Again, the divisor vector data $D_\nu$ is read out. Then, it is input to the complement generator 3. From the complement generator 3, the complement $P_{0\nu}=(2-D_\nu)$ of $D_\nu$ is output. The selector 4 selectively outputs the divisor vector data $D_\nu$ to the multiplier 6. On the other hand, the selector 5 selectively outputs the output $P_{0\nu}$ of the complement generator 3 to the multiplier 6. The multiplier 6 calculates $D_{1\nu}=D_\nu \times P_{0\nu}$ and stores the result in the intermediate result storage area 21 of the vector register 2. By establishing the foregoing process as a pipeline process, the calculation can be done sequentially, namely at every clock cycle.

(C) Arithmetic Operation for $N_{2\nu}$

Next, $N_{1\nu}$ is read out from the intermediate storage area 11 of the vector register 1. $N_{1\nu}$ is then input to the multiplier 6 via the selector 4. On the other hand, $D_{1\nu}$ is read out from the intermediate result storage area 21 of the vector register 2. The read out $D_{1\nu}$ is input to the complement generator 3. The complement generator 3 outputs the complement $P_{1\nu}=(2-D_{1\nu})$ of $D_{1\nu}$. $P_{1\nu}$ as the output of the complement generator 3 is input to the multiplier 6 via the selector 5. The multiplier 6 calculates $N_{2\nu}=N_{1\nu} \times P_{1\nu}$ and stores in the intermediate result storage area 11. By establishing the foregoing process as a pipeline process, the calculations can be done sequentially for each element, namely at every clock cycle.

(D) Arithmetic Operation of $D_{2\nu}$

Then, $D_{1\nu}$ is read out from the intermediate result storage area 21 of the vector register 2. $D_{1\nu}$ is input to the multiplier 6 via the selector 4. On the other hand, $D_{1\nu}$ is also input to the complementary generator 3. The complementary generator 3 then outputs the complement $P_{1\nu}(=2-D_{1\nu})$ of $D_{1\nu}$. $P_{1\nu}$ thus derived is input to the multiplier 6 via the selector 5. The multiplier 6 calculates $D_{2\nu}=D_{1\nu} \times P_{1\nu}$ and stores the result in the intermediate result storage area 21 of the vector register 2.

Subsequently, calculations for $N_{i\nu}$ and $D_{1\nu}$ are repeated in the foregoing manners of (C) and (D). By repeating the process of (C) and (D), $N_{i\nu}$ converges to the quotient Q. The quotient Q is finally output as data $L_4$. The quotient vector of one element is then output in one clock cycle. Therefore, for every clock cycle, a respective quotient vector for respective vector elements can be output on a one-by-one basis.

Figure 2:
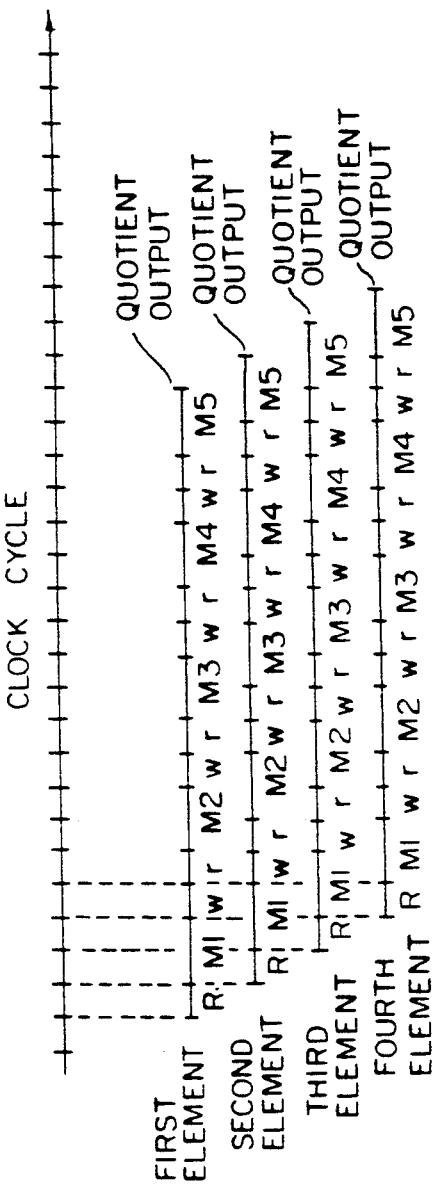
FIG. 2 is a timing chart showing an example of operation of the preferred embodiment of the present invention.

FIG. 2 is a timing chart for the foregoing vector dividing process performed by the shown embodiment of the vector divider system according to the present invention. In FIG. 2, R represents a reading out timing of the divisor and dividend, Mi represents an ith multiplying timing, W represents a writing timing of the intermediate result, r represents a reading out timing of the intermediate result. In the shown example, the quotient is output at i=5.

Here, calculation of $N_{i\nu}$ and $D_{i\nu}$ of each element is performed in two clock cycles. However, by employing the pipeline process, outputs $N_{i\nu}$ and $D_{i\nu}$ of respective elements are output each clock cycle. Also, similarly to the prior art, the total number of the vector elements is assumed to be four. Then, the number of multiplying operations required to obtain the quotient becomes five. As becomes clear by comparing FIG. 2 with the timing chart of FIG. 4, throughput for outputting the quotient and the period required for processing all elements can be remarkably improved in the present invention.

As set forth above, the vector dividing method and system according to the present invention employ a vector register having a storage area for storing the dividend and for storing a intermediate results, and the vector register having a storage area for storing the divisor and for storing the intermediate results, so as to enable outputting of the quotients every clock cycle by temporarily storing the pipeline processed intermediate results at for every multiplying operation in a repeated process. Such process is also effective for shortening the period required for completing calculations for all vector elements.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which fall within the scope encompassed and equivalents thereof with respect to the feature set out in the appended claims.

What is claimed is:

1. A vector division processing apparatus for performing a division operation on dividend vector data composed of a plurality of elements and divisor vector data composed of a plurality of elements by employing a convergence division method in which each of said dividend vector data and said divisor vector data is multiplied in sequence by a plurality of convergence factor vector data to thereby converge resultant data of the sequential multiplication operations performed on said dividend vector data to a quotient and converge resultant data of the sequential multiplication operation performed on said divisor vector data to 1, said apparatus comprising:

a first vector register having a first storage area for temporarily storing said dividend vector data and a second storage area, a second vector register having a third storage area for temporarily storing said divisor vector data and a fourth storage area, and an operation unit having a first input terminal coupled to said first vector register to receive data supplied therefrom, a second input terminal coupled to said second vector register to receive data supplied therefrom and an output terminal coupled to each of said first and second vector registers, said operation unit performing;

a first processing operation in which respective multiplication operations on said elements of said dividend vector data stored in said first storage area of said first vector register and associated ones of said convergence factor vector data are performed in sequence to produce a plurality of first intermediate resultant data and said plurality of first intermediate resultant data are written in sequence into said second storage area of said first vector register, a second processing operation in which respective multiplication operations on said elements of said divisor vector data stored in said third storage area of said second vector register and associated ones of said convergence factor vector data are performed in sequence to produce a plurality of second intermediate resultant data and said plurality of second intermediate resultant data are written in sequence into said fourth stage area of said second vector register, after said first and second processing operations are completed, a third processing operation in which respective multiplication operations on said plurality of first intermediate resultant data stored in said second storage area of said first vector register and associated ones of said convergence factor vector data are performed in sequence to produce a plurality of third intermediate resultant data and said plurality of third intermediate resultant data are written in sequence into said second storage area of said first vector register, and after said first and second processing operations are completed, a fourth processing operation in which respective multiplication operations on said plurality of second intermediate resultant data stored in said fourth storage area of said second vector register and associated ones of said convergence factor vector data are performed in sequence to produce a plurality of fourth intermediate resultant data and said plurality of fourth intermediate resultant data are written in sequence into said fourth storage area of said second vector register.

2. The apparatus as claimed in claim 1, wherein:
the respective multiplication operations in said first processing operation are performed in a pipelined manner,
the respective multiplication operations in said second processing operation are performed in a pipelined manner,
the respective multiplication operations in said third processing operation are performed in a pipelined manner, and
the respective multiplication operations in said fourth processing operation are performed in a pipelined manner.

3. The apparatus as claimed in claim 2, wherein said operation unit comprises:
a first selector having a first input node coupled to said first terminal, a second input node coupled to said second input terminal and a first output node,
generator means coupled to said second terminal for generating said convergence factor vector data,
a second selector having a third input node coupled to said second terminal, a fourth input node coupled to said generator means to receive said convergence factor vector data and a second output node, and a multiplier having a fifth input node coupled to said first output node of said first selector, a sixth input node coupled to said second output node of said second selector and a third output node coupled to said output terminals.

4. The apparatus as claimed in claim 3, wherein said generator means comprises a complement generator for generating two's complement data of output data obtained from said second output node of said second selector.

5. In a vector division processing system, a method for performing a division operation on dividend vector data composed of a plurality of elements and divisor vector data composed of a plurality of elements by employing a convergence division method in which each of said dividend vector data and said divisor vector data is multiplied in sequence by a plurality of convergence factor vector data to thereby converge resultant data of the sequential multiplication operations performed on said dividend vector data to a quotient and converge resultant data of the sequential multiplication operation performed on said divisor vector data to 1, wherein the system includes:

a first vector register having a first storage area for temporarily storing said dividend vector data and a second storage area, a second vector register having a third storage area for temporarily storing said divisor vector data and a fourth storage area, and an operation unit having a first input terminal coupled to said first vector register to receive data supplied therefrom, a second input terminal coupled to said second vector register to receive data supplied therefrom and an output terminal coupled to the method comprising the following steps:

a first processing operation in which respective multiplication operations on said elements of said dividend vector data stored in said first storage area of said first vector register and associated ones of said convergence factor vector data are performed in sequence to produce a plurality of first intermediate resultant data and said plurality of first intermediate resultant data are written in sequence into said second storage area of said first vector register, a second processing operation in which respective multiplication operations on said elements of said divisor vector data stored in said third storage area of said second vector register and associated ones of said convergence factor vector data are performed in sequence to produce a plurality of second intermediate resultant data and said plurality of second intermediate resultant data are written in sequence into said fourth storage area of said second vector register, after said first and second processing operations are completed, a third processing operation in which respective multiplication operations on said plurality of first intermediate resultant data stored in said second storage area of said first vector register and associated ones of said convergence factor vector data are performed in sequence to produce a plurality of third intermediate resultant data and said plurality of third intermediate resultant data are written in sequence into said second storage area of said first vector register, and after said first and second processing operations are completed, a fourth processing operation in which respective multiplication operations on said plurality of second intermediate resultant data stored in said fourth storage area of said second vector register and associated ones of said convergence factor vector data are performed in sequence to produce a plurality of fourth intermediate resultant data and said plurality of fourth intermediate resultant data are written in sequence into said fourth storage area of said second vector register.

6. The method as claimed in claim 5, wherein:

the respective multiplication operations in said first processing operation are performed in a pipelined manner, the respective multiplication operations in said second processing operation are performed in a pipelined manner, the respective multiplication operations in said third processing operation are performed in a pipelined manner, and the respective multiplication operations in said fourth processing operation are performed in a pipelined manner.

* * * * *

UNITED STATES PATENT AND TRADEMARK OFFICE
CERTIFICATE OF CORRECTION

PATENT NO. : 5,309,385
DATED : May 3, 1994
INVENTOR(S) : Fuyuki Okamoto

It is certified that error appears in the above-indentified patent and that said Letters Patent is hereby corrected as shown below:

Col. 6, line 9, delete "formed product" and insert --product formed--.

Col. 7, line 15, after "register" insert --1--.

Col. 10, line 36, after "to" insert --each of said first and second vector registers.,--.

Signed and Sealed this

Fifteenth Day of November, 1994

Attest:

BRUCE LEHMAN

*Attesting Officer*    *Commissioner of Patents and Trademarks*